United States Patent

[11] 3,617,111

[72] Inventor Motoaki Kawazu
    Tokyo, Japan
[21] Appl. No. 68,411
[22] Filed Aug. 31, 1970
[45] Patented Nov. 2, 1971
[73] Assignee Ricoh Co., Ltd.
    Tokyo, Japan
[32] Priority Aug. 28, 1969
[33] Japan
[31] 44/67584

[54] LARGE-APERTURE PHOTOGRAPHIC LENS WITH SEVEN ELEMENTS IN FIVE GROUPS
    1 Claim, 4 Drawing Figs.
[52] U.S. Cl. .............................. 350/217, 350/176
[51] Int. Cl. .............................. G02b 9/60
[50] Field of Search ...................... 350/217, 176

[56] References Cited
    UNITED STATES PATENTS
    2,735,339  2/1956  Doi ............................. 350/217
    2,959,103  11/1960 Cook ........................... 350/217 X Primary Examiner—John K. Corbin
Attorneys—Henry T. Burke, Robert Scobey, Robert S. Dunham, P. E. Henninger, Lester W. Clark, Gerald W. Griffin, Thomas F. Moran, R. Bradlee Boal and Christopher C. Dunham ABSTRACT: A large-aperture photographic lens adapted for use as the standard lens with single-lens reflex cameras. The lens consists of seven elements in five groups and has a back focal length greater than 0.68 times the focal length of 1.0 a picture angle of 44° and an $f$-number of 1.1. The image errors, especially the spherical aberration of the higher order, are well corrected.

SPHERICAL ABERRATION

ASTIGMATISM

DISTORTION

MOTOAKI KAWAZU
INVENTOR.
BY Lester W Clark
ATTORNEY

LARGE-APERTURE PHOTOGRAPHIC LENS WITH SEVEN ELEMENTS IN FIVE GROUPS

BACKGROUND OF THE INVENTION

The present invention relates to a photographic objective and more particularly a large-aperture photographic objective which may be used as a standard lens for single-lens reflex cameras and has a back focal length greater than 0.68 times the focal length, a picture angle of 44° and an $f$-number of 1.1.

It is impossible to employ a lens having a back focal length shorter than a predetermined length with a single-lens reflex camera whose image space is occupied by a hinged mirror. Furthermore, it is very difficult to provide a large-aperture standard photographic objective having a longer back focal length especially because the outer diameter of the rear lens group of a lens system is limited by a lens mount having a predetermined diameter.

SUMMARY OF THE INVENTION

It is therefore the primary object of the present invention to provide a large-aperture photographic objective lens consisting of seven lenses in five groups which can eliminate the above-described defects and whose image errors, especially the spherical aberration of the higher order, are well corrected so that the bulging of the aberration curve which tends to occur especially in case of a large-aperture lens, the furrows which tend to occur along the peripheral edge and the coma may be sufficiently eliminated. The invention will become more apparent from the following description of the preferred embodiment thereof taken in conjunction with the accompanying drawing.

DESCRIPTION OF THE PREFERRED EMBODIMENT

Figure 1:
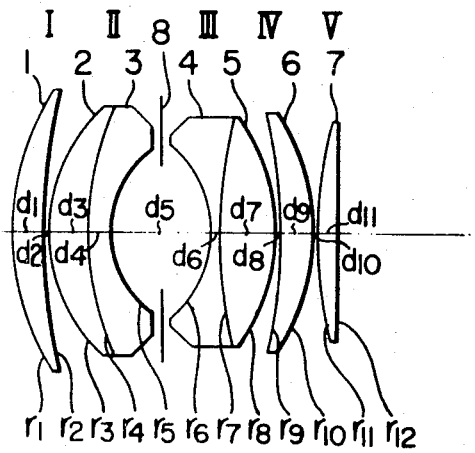
FIG. 1 is a diagrammatic view of one embodiment of the present invention.

Referring to FIG. 1, a large-aperture photographic lens in accordance with the present invention comprises seven elements divided into five groups. More particularly, the large-aperture photographic objective of the present invention is a modification of the so-called Gauss objective, in which the rear group is further divided into two groups or elements. The first group (the groups or elements being numbered from front to rear) I consists of a positive meniscus lens; the second group II consists of the second positive meniscus lens 2 and third negative meniscus lens 3 cemented together; the third group III consists of a biconcave lens 4 and a biconvex lens 5 cemented together; the fourth group IV consists of a positive meniscus lens 6; and the fifth group V consists of a biconvex lens 7. A stop 8 is interposed between the third lens 3 and fourth lens 4.

The design data are given below, where
$r$ with a subscript designates a radius of curvature of a surface identified by the subscript, the surfaces being numbered from front to rear and a positive radius indicating a surface convex toward the front while a minus radius indicates a surface concave toward the front;

$d$ with a subscript designates a thickness of a lens or a distance of airspace along the optical axis identified by the subscript, the thicknesses and distances of airspace being numbered from front to rear;

$n$ with a subscript designates an index of refraction when using $d$-line of helium of a lens identified by the subscript; and $v$ with a subscript designates a dispersion ratio of a lens identified by the subscript.

$r_1$=0.82451 $d_1$=0.11203 $n_1$=1.80440 $V_1$=39.6
$r_2$=2.61302 $d_2$=0.00181
$r_3$=0.51829 $d_3$=0.13191 $n_2$=1.75700 $V_2$=47.8
$r_4$=0.99758 $d_4$=0.05782 $n_3$=1.71736 $V_3$=29.5
$r_5$=0.31233 $d_5$=0.33971
$r_6$=−0.34345 $d_6$=0.02710 $n_4$=1.78472 $V_4$=25.6
$r_7$=3.26154 $d_7$=0.19154 $n_5$=1.76200 $v_5$=40.2
$r_8$=−0.55605 $d_8$=0.00181
$r_9$=−2.71114 $d_9$=0.12107 $n_6$=1.71300 $V_6$=53.9
$r_{10}$=−0.66134 $d_{10}$=0.00181
$r_{11}$=1.45848 $d_{11}$=0.06324 $n_7$=1.77390 $V_7$=50.6
$r_{12}$=−19.87641

Compound focal length $f$=1.0 ; back focus:0.682×$f$; $f$-number =1.1 and total field of view 2ω=44°.

The Seidel's coefficients are as follows:

|    | Spherical aberration | Coma | Astigmatism | Curvature | Distortion |
|----|---------|---------|---------|---------|---------|
| 1  | 0.441   | 0.083   | 0.016   | 0.541   | 0.105   |
| 2  | 0.039   | −0.149  | 0.568   | −0.171  | −1.523  |
| 3  | −0.024  | −0.009  | −0.003  | 0.831   | 0.315   |
| 4  | 0.007   | −0.017  | 0.041   | −0.013  | −0.065  |
| 5  | −0.795  | −0.259  | −0.085  | −1.337  | −0.464  |
| 6  | −1.742  | 0.720   | −0.298  | −1.280  | 0.652   |
| 7  | −0.009  | −0.016  | −0.028  | −0.002  | −0.052  |
| 8  | 0.359   | −0.147  | 0.060   | 0.778   | −0.344  |
| 9  | −0.003  | 0.015   | −0.071  | −0.154  | 1.043   |
| 10 | 1.323   | 0.023   | 0.000   | 0.629   | 0.011   |
| 11 | 0.002   | 0.027   | −0.349  | 0.299   | 0.633   |
| 12 | 0.504   | −0.249  | 0.123   | 0.022   | −0.071  |
| Σ  | 0.097   | 0.022   | −0.0244 | 0.143   | 0.241   |

Figure 2A:
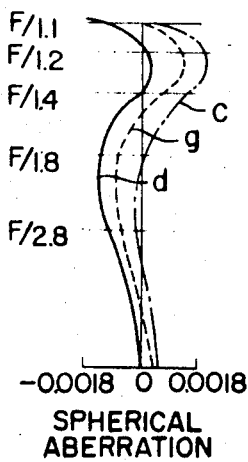
FIG. 2A depicts the spherical aberration curve, FIG. 2B, the astigmatism curve and FIG. 2C, the distortion curve.
Figure 2B:
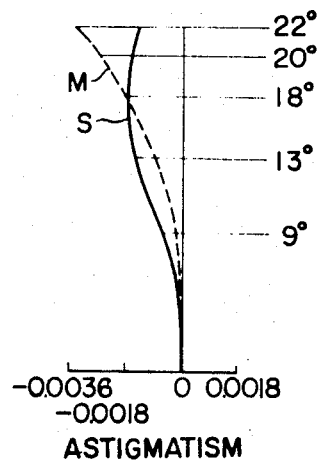
Figure 2C:
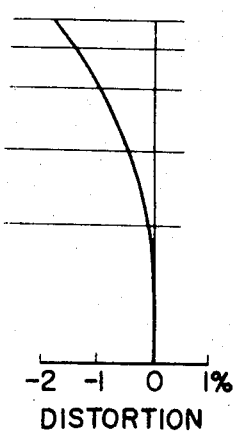

The aberration curves are shown in FIG. 2 in which the curves $d$, $g$ and $c$ designate the spherical aberration curves for $d$-line of helium, $g$-line of mercury and $c$-line of hydrogen while the curves M and S designate (the astigmatism curves) in the meridional and sagittal planes respectively.

It will be seen that the spherical aberration at higher orders is well corrected and the flare at full aperture may be minimized. Furthermore, the coma and astigmatism are also well corrected as seen from the Seidel coefficients, so that an object may be sharply imaged.

I claim:

1. A large-aperture photographic objective consisting of seven elements in five groups, which are numbered from front to rear; the first group consisting of a positive meniscus lens; the second group consisting of positive meniscus and negative meniscus lenses cemented together; the third group consisting of a biconcave and biconvex lenses cemented together; the fourth group consisting of a positive meniscus lens; and the fifth group consisting of a biconvex lens; and satisfying the following conditions:

$f$=1.0
$Bf$=0.6825$f$
F=1.1
2ω=44°
$r_1$=0.82451 $d_1$=0.11203 $n_1$=1.80440 $V_1$=39.6
$r_2$=2.61302 $d_2$=0.00181
$r_3$=0.51829 $d_3$=0.13191 $n_2$=1.75700 $V_2$=47.8
$r_4$=0.99758 $d_4$=0.05782 $n_3$=1.71736 $V_3$=29.5
$r_5$=0.31233 $d_5$=0.33971
$r_6$=−0.34345 $d_6$=0.02710 $n_4$=1.78472 $V_4$=25.6
$r_7$=3.26154 $d_7$=0.19154 $n_5$=1.76200 $V_5$=40.2
$r_8$=−0.55605 $d_8$=0.00181
$r_9$=−2.71114 $d_9$=0.12107 $n_6$=1.71300 $V_6$=53.9
$r_{10}$=−0.66134 $d_{10}$=0.00181
$r_{11}$=1.45848 $d_{11}$=0.06324 $n_7$=1.77390 $V_7$=50
$r_{12}$=−19.87641 where $r$ with a subscript designates a radius of curvature of a surface of a lens identified by the subscript, the surface being numbered from front to rear and a positive radius indicating a surface convex toward the front while a minus radius, a surface concave toward the front;

$d$ with a subscript designates a thickness of a lens or distance of airspace along the optical axis identified by the subscript, the thicknesses and distances being numbered from front to rear;

$n$ with a subscript designates an index of refraction of a lens identified by the subscript when $d$-line of helium is used;
$V$ with a subscript designates a dispersion ratio of a lens identified by the subscript;
$f=$ compound focal length;
$Bf=$ back focus;
$F=f$-number; and
$2\omega=$ total field of view.